(12) United States Patent
Myoung

(10) Patent No.: US 11,595,712 B2
(45) Date of Patent: Feb. 28, 2023

(54) TV BROADCASTING SYSTEM THAT AUTOMATICALLY GENERATES PROGRESS DATA FOR BROADCASTING

(71) Applicant: SK STOA CO., LTD., Seoul (KR)

(72) Inventor: Dae Ho Myoung, Seoul (KR)

(73) Assignee: SK STOA CO., LTD., Seoul (KR)

( * ) Notice: Subject to any disclaimer, the term of this patent is extended or adjusted under 35 U.S.C. 154(b) by 0 days.

(21) Appl. No.: 17/220,457

(22) Filed: Apr. 1, 2021

(65) Prior Publication Data

US 2021/0314642 A1   Oct. 7, 2021

(30) Foreign Application Priority Data

Apr. 2, 2020 (KR) .................. 10-2020-0040468

(51) Int. Cl.
| | |
|---|---|
| *H04N 21/262* | (2011.01) |
| *H04N 21/6338* | (2011.01) |
| *H04N 21/239* | (2011.01) |
| *H04N 21/643* | (2011.01) |

(52) U.S. Cl.
CPC ....... *H04N 21/262* (2013.01); *H04N 21/2393* (2013.01); *H04N 21/6338* (2013.01); *H04N 21/64322* (2013.01)

(58) Field of Classification Search
CPC ............. H04N 21/237; H04N 21/2393; H04N 21/254; H04N 21/262; H04N 21/6338; H04N 21/64322; H04N 21/812; H04N 21/858
See application file for complete search history.

(56) References Cited

U.S. PATENT DOCUMENTS

| | | | | |
|---|---|---|---|---|
| 6,201,536 | B1 * | 3/2001 | Hendricks | .......... H04N 21/8586 348/E5.103 |
| 7,024,681 | B1 * | 4/2006 | Fransman | .......... H04N 7/17327 725/115 |
| 7,222,155 | B1 * | 5/2007 | Gebhardt | ................ H04L 67/20 709/204 |
| 2003/0149988 | A1 * | 8/2003 | Ellis | ..................... H04N 21/262 725/62 |
| 2004/0034863 | A1 * | 2/2004 | Barrett | ................ H04W 74/008 725/38 |
| 2008/0120658 | A1 * | 5/2008 | Cubillo | .............. H04N 21/8173 348/E7.071 |
| 2008/0263599 | A1 * | 10/2008 | Knudson | .......... H04N 21/26613 725/50 |

(Continued)

FOREIGN PATENT DOCUMENTS

| | | |
|---|---|---|
| KR | 101475449 | 12/2014 |
| KR | 1020180053950 | 5/2018 |
| KR | 1020190097455 | 8/2019 |

OTHER PUBLICATIONS

Office Action issued to Korean Application 1020200040468, dated Feb. 15, 2021.

*Primary Examiner* — Farzana Hossain
(74) *Attorney, Agent, or Firm* — Burris Law, PLLC

(57) ABSTRACT

A broadcasting system that automatically generates broadcast transmission progress data generates and provides broadcast transmission progress data for real-time broadcast images including product information, discount information, and delivery information related to real-time broadcast images.

15 Claims, 10 Drawing Sheets

(56) References Cited

U.S. PATENT DOCUMENTS

| | | | | |
|---|---|---|---|---|
| 2008/0267584 | A1* | 10/2008 | Green | H04N 21/812 |
| | | | | 386/250 |
| 2010/0146552 | A1* | 6/2010 | Hassell | H04N 21/435 |
| | | | | 725/50 |
| 2011/0292280 | A1* | 12/2011 | Sloo | H04N 21/4668 |
| | | | | 348/465 |
| 2013/0019268 | A1* | 1/2013 | Fitzsimmons | H04N 21/2542 |
| | | | | 725/60 |
| 2015/0382052 | A1* | 12/2015 | Pearlman | H04N 21/44226 |
| | | | | 725/46 |
| 2016/0066049 | A1* | 3/2016 | Mountain | H04N 21/4622 |
| | | | | 725/58 |

* cited by examiner

TV BROADCASTING SYSTEM THAT AUTOMATICALLY GENERATES PROGRESS DATA FOR BROADCASTING

CROSS-REFERENCE TO RELATED APPLICATION AND PRIORITY

This application is based on and claims priority under 35 U.S.C. § 119 to Korean Patent Application No. 10-2020-0040468, filed on Apr. 2, 2020, in the Korean Intellectual Property Office, the disclosure of which is incorporated by reference herein in its entirety.

BACKGROUND

1. Field

The present disclosure relates to a broadcasting system that automatically generates progress data for broadcasting a transmission.

2. Description of the Related Art

With the recent development of TV technology and digital technology, various information is being delivered through TVs to viewers. For example, TV home shopping, which provides shopping information through a TV, provides various information according to technological changes. Moreover, with the recent commercialization of digital-based digital television technology, it has become possible to provide various contents through a communication network connected to each home, such as the Internet. An Internet Protocol Television (IPTV) service is a representative example.

In the IPTV service, various services can be provided to IPTV service subscribers through a set-top box installed in a designated space such as subscribers' home. Among the various services, a home shopping broadcasting service (or commerce broadcasting) provided through a commerce channel may also be provided.

A commerce service provider, which produces a home shopping broadcasting service, may be arranged to have a commerce channel (i.e., a home shopping broadcasting service) with a channel assigned/promised to that commerce service provider.

Accordingly, when an IPTV service subscriber selects a channel promised in the set-top box, the set-top box receives a regularly scheduled broadcast via that channel and outputs the broadcast via TV. The IPTV service subscriber can watch commerce channels and use home shopping broadcasting services broadcasted via the commerce channels. Services via the commerce channels, such as delivery of various shopping information according to a user's request, confirmation of shopping information, and ordering may be improved.

SUMMARY

Embodiments of the present disclosure may generate and provide broadcast transmission progress data for a real-time broadcast image with respect to product information, discount information, and delivery information related to the real-time broadcast image.

Additional aspects will be set forth in part in the description which follows and, in part, will be apparent from the description, or may be learned by practice of the presented embodiments of the disclosure.

According to one or more embodiments, a broadcasting system that automatically generates progress data for broadcasting a transmission includes a media cloud server and a set-top box communicating with the media cloud server, wherein the media cloud server receives first broadcast image data to be outputted in correspondence to an output schedule and broadcast transmission progress data corresponding to the first broadcast image data from a data server, and generates the first broadcast image data and the broadcast transmission progress data as one output data and transmits the generated data to the set-top box, wherein the set-top box includes: a communication unit configured to communicate with the media cloud server, an acquisition unit configured to acquire a user input from a remote controller for TV broadcast, and an output control unit configured to control output data received from the media cloud server to be output through an external output device.

In at least one variant, the media cloud server regenerates broadcast transmission progress data in response to a user input acquired through the set-top box, and transmits the regenerated broadcast transmission progress data.

In another variant, the media cloud server receives broadcast transmission progress data of second broadcast image data corresponding to an identification (ID) of the second broadcast image data from the data server according to a control signal for stopping transmission of the first broadcasting image data and starting transmission of the second broadcasting image data.

In further another variant, the broadcast transmission progress data is generated, in detailed information of the first broadcast image data, by using at least one of size information, color information, discount information, broadcast time information, delivery information, and review information of the first broadcast image data.

In another variant, the broadcast transmission progress data includes size information, color information, discount information, broadcast time information, delivery information, and review information of the first broadcast image data, wherein the size information, color information, discount information, broadcast time information, delivery information, and review information of the first broadcast image data are controlled to be sequentially output in a random order.

In yet another variant, the media cloud server receives first user input received from the set-top box, and generates a user interface according to the first user input to process the user interface to be directly output through the output data.

According to one or more embodiments, a method of operating a media cloud server includes steps of: receiving, by the media cloud server, first broadcast image data to be output in correspondence to an output schedule from the data server, generating, by the media cloud server, broadcast transmission progress data corresponding to the first broadcast image data, and generating, by the media cloud server, the first broadcast image data and the broadcast transmission progress data as one output data and transmitting the generated output data to a set-top box.

The method further includes, in correspondence to a user input acquired through the set-top box, regenerating, by the media cloud server, broadcast transmission progress data, and transmitting, by the media cloud server, the regenerated broadcast transmission progress data to the set-top box.

The method further includes, according to a control signal to start transmitting second broadcast image data, receiving, by the media cloud server, broadcast transmission progress data generated using detailed information of the second broadcast image data corresponding to an identification (ID) of the second broadcast image data.

The broadcast transmission progress data is at least one of size information, color information, discount information, broadcast time information, delivery information, and review information of the first broadcast image data in detailed information of the first broadcast image data.

The broadcast transmission progress data includes size information, color information, discount information, broadcast time information, delivery information, and review information of the first broadcast image data, wherein the size information, color information, discount information, broadcast time information, delivery information, and review information of the first broadcast image data are controlled to be sequentially output in a random order.

The method further includes receiving, by the media cloud server, first user input received from the set-top box, and generating, by the media cloud server, a user interface according to the first user input to process the user interface to be directly outputted through the output data.

A computer program is stored in a computer-readable storage medium to execute the above method by using a computer.

The computer program according to the embodiment of the present disclosure may be stored in a medium in order to execute any one of the methods according to the embodiment of the present disclosure using a computer.

In addition, another method for implementing the present disclosure, another system, and a computer-readable recording medium for recording a computer program for executing the method are further provided.

Other aspects, features, and advantages other than those described above will become apparent from the following drawings, claims, and detailed description of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 4 is a flowchart illustrating generating a first broadcast image data and broadcast transmission progress data as first output data at the TV broadcast providing server;

FIG. 5 is a flowchart illustrating updating second output data with received broadcast transmission progress data at the TV broadcast providing server; and FIG. 6 is a flowchart illustrating updating third output data with second broadcast image data and broadcast transmission progress data at the TV broadcast providing server;

DETAILED DESCRIPTION

Figure 1:
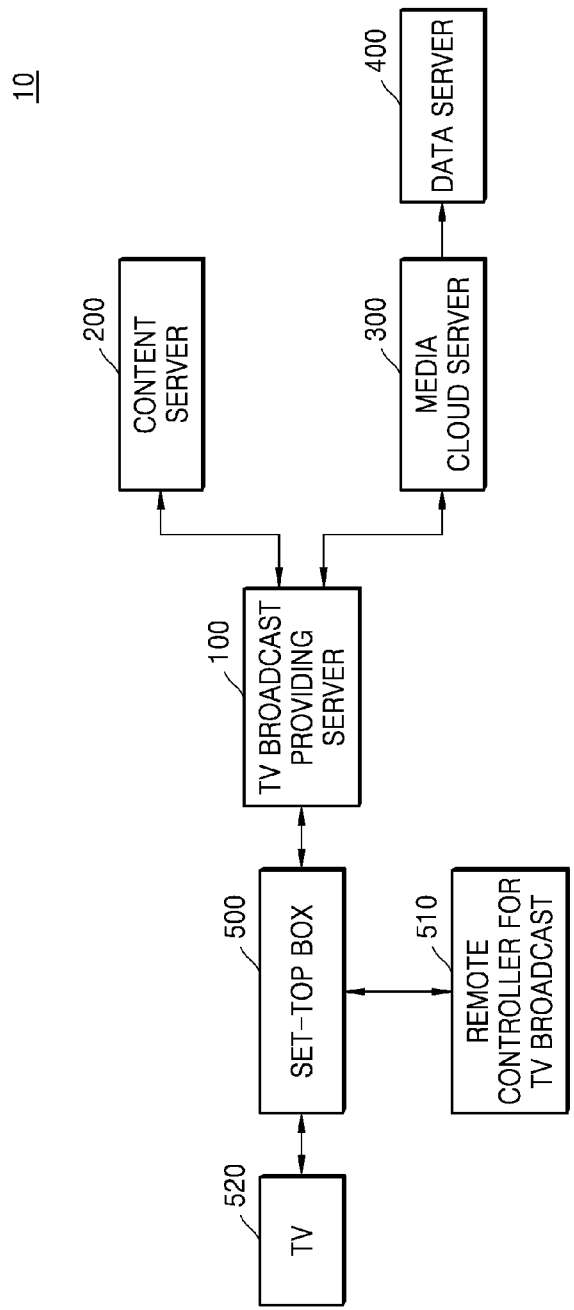
FIG. 1 is a diagram illustrating a network environment of a TV broadcasting system including a TV broadcast providing server according to one or more embodiments of the present disclosure.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, the configuration and operation of the present disclosure will be described in detail with reference to embodiments of the present disclosure shown in the accompanying drawings.

Since the present disclosure can apply various modifications and have various embodiments, specific embodiments are illustrated with reference to the drawings and will be described in detail. Effects and features of the present disclosure, and a method of achieving them will be apparent with reference to the embodiments described below in detail together with the drawings. However, the present disclosure is not limited to the embodiments disclosed below and may be implemented in various forms.

Hereinafter, embodiments of the present disclosure will be described in detail with reference to the accompanying drawings, and when describing with reference to the drawings, the same or corresponding constituent elements are given the same reference numerals, and redundant descriptions thereof will be omitted.

In the following embodiments, terms such as first and second are not used in a limiting meaning, but for the purpose of distinguishing one component from another component.

In the following examples, the singular expression includes the plural expression unless the context clearly indicates otherwise.

In the following embodiments, terms such as include or have means that the features or elements described in the specification are present, and do not preclude the possibility of adding one or more other features or elements in advance.

In the drawings, components may be exaggerated or reduced in size for convenience of description. For example, the size and thickness of each component shown in the drawings are arbitrarily shown for convenience of description, and thus the present disclosure is not necessarily limited to what is shown.

When a certain embodiment can be implemented differently, a specific process order may be performed differently from the described order. For example, two processes described in succession may be performed substantially simultaneously, or may be performed in an order opposite to the described order.

In this specification, the set-top box communicates with a media providing server to receive output data, interprets and reads (or encodes) the received output data, and outputs the interpreted and read output data through an output device such as a TV. The set-top box can output broadcast output data received from a media providing server through an output device.

FIG. 1 is a diagram illustrating a network environment of a TV broadcasting system 10 including a TV broadcast providing server 100 according to embodiments of the present disclosure. The TV broadcasting system 10 includes a TV broadcast providing server 100, a content server 200, a medial cloud server 300, a data server 400. The network environment of the TV broadcasting system 10 includes a set-top box 500, a remote controller for TV broadcast 510, and a TV 520.

The TV broadcasting system 10 may generate broadcast output data through the TV broadcast providing server 100 and transmit the generated broadcast output data to the set-top box 500.

The TV broadcast providing server 100 may generate broadcast output data based on data received from the content server 200 and the media cloud server 300. The TV broadcast providing server 100 may generate a control signal for controlling the set-top box and control the set-top box 500 through a program or programs installed in the set-top box 500. In some forms, the TV broadcast providing server 100 may perform a function of reading information from the set-top box 500. Additionally, or alternatively, the TV broadcast providing server 100 may receive a platform code, STP ID, access information from the set-top box 500. The TV broadcast providing server 100 may generate output data of the set-top box 500 based on the received information.

In some forms, the TV broadcast providing server 100 may request a broadcasting signal by communicating with the media cloud server 300 and receive a broadcasting image.

The media cloud server 300 may receive product information, customer information, order information, organization information, and the like from a data server 400 as shown in FIG. 1. In some forms, the data server 400 is an external server to the media cloud server 300.

In one form, the data server 400 is a computing device in which a server program such as Apache Tomcat® or Oracle is installed, and may be implemented to process server functions. The data server 400 may store product information including product code, broadcast identification ("ID"), etc., production information including PD(Producer) code, SH(Show host) code, Time code, etc., deliberation information including deliberation completion/progress status values, etc., and platform transmission result acquisition CID (content Identification), etc., and provide information in response to a request from the media cloud server 300.

The TV broadcast providing server 100 may receive a broadcast image by communicating with the content server 200 or the media cloud server 300. The TV broadcast providing server 100 may acquire broadcast images and Video On Demand ("VOD") data by using the CID received from the media cloud server 300. The TV broadcast providing server 100 may transmit the acquired broadcast image and VOD data to the set-top box 500 to be outputted.

Figure 2:
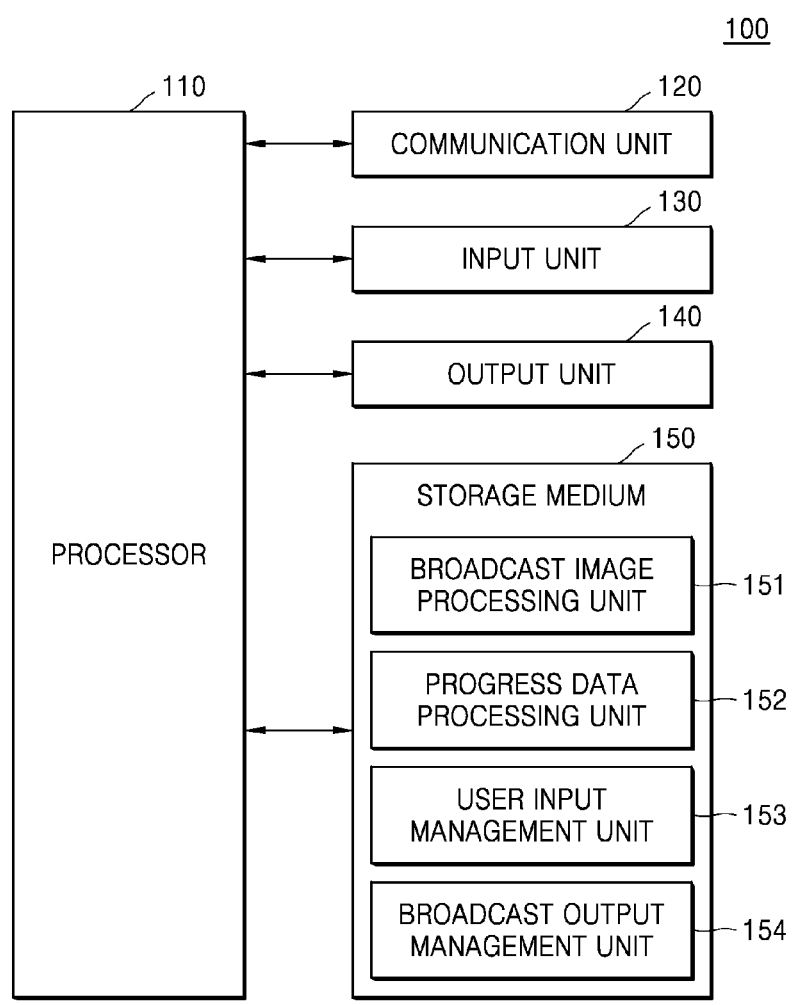
FIG. 2 is a block diagram of a TV broadcast providing server according to one or more embodiments of the present disclosure.

FIG. 2 is a block diagram of the TV broadcast providing server 100 as shown in FIG. 1.

The processor 110 is a component for overall control of the TV broadcast providing server 100. Specifically, the processor 110 controls the overall operation of the TV broadcast providing server 100 by using various programs stored in the storage medium 150 of the TV broadcast providing server 100. For example, the processor 110 may include a CPU, RAM, ROM, and a system bus. Here, the ROM is a component in which the command set for booting the system is stored, and the CPU copies the stored operating system (O/S) of the TV broadcast providing server 100 to RAM according to the command stored in the ROM, and executes O/S to boot the system. When booting is complete, the CPU can perform various operations by copying various stored applications to RAM and executing the various stored applications. In the above, it has been described that the TV broadcast providing server 100 includes only one CPU, but the TV broadcast providing server 100 may be implemented with a plurality of CPUs (or DSP, SoC, etc.).

In some forms, the processor 110 may be implemented as a digital signal processor (DSP) that processes digital signals, a microprocessor, and a time controller (TCON). However, the processor 110 is not limited thereto, and may include one or more of a central processing unit (CPU), a microcontroller unit (MCU), a micro processing unit (MPU), a controller, an application processor (AP), a communication processor (CP), and an advanced RISC machine (ARM) processor, or may be defined in the corresponding term. In addition, the processor 110 may be implemented as a system on chip (SoC) or large scale integration (LSI) with a built-in processing algorithm, or may be implemented in the form of a field programmable gate array (FPGA).

The output unit 140 may display an interface generated by executing instructions stored in a storage medium 150 with the processor 110. The output unit 140 may display a user interface for a user input which is input through the input unit 130. The output unit 140 may output stored graphic data, visual data, auditory data, and vibration data under the control of the storage medium 150.

The input unit 130 may include a user interface for inputting various information for the TV broadcast providing server 100.

The communication unit 120 is a component for transmitting and receiving data with devices such as a server and other electronic devices. The communication unit 120 may include a short-range communication unit such as a Bluetooth communication unit, a Bluetooth Low Energy (BLE) communication unit, a Near Field Communication unit, a wireless local area network (WLAN) communication unit, a Zigbee communication unit, an infrared Data Association (IRDA) communication unit, a Wi-Fi Direct (WFD) communication unit, a ultra wideband (UWB) communication unit, and an Ant+ communication unit, a mobile communication network, or a wired Ethernet network.

The communication unit 120 may be a component that is communicatively connected to the content server 200 through a CDN.

As shown in FIG. 2, the TV broadcast providing server 100 further includes the storage medium 150 storing various data for overall operation, including a program for processing or controlling the processor 110. The storage medium may store data and instructions for a number of application programs or applications running in the TV broadcast providing server 100, and operations of the TV broadcast providing server 100. At least some of these application programs may be downloaded from an external server through wireless communication. In addition, at least some of these application programs may exist on the TV broadcast providing server 100 from the time of shipment for basic functions of the TV broadcast providing server 100. The application program may be stored in a storage medium and driven by the processor 110 to perform an operation (or function) of the TV broadcast providing server 100.

As shown in FIG. 2, the storage medium 150 may include a broadcast image processing unit 151, a progress data processing unit 152, a user input management unit 153, and a broadcast output management unit 154 to generate output data for TV broadcasting.

The broadcast image processing unit 151 may communicate with the media cloud server 300 to receive broadcast image data for broadcast transmission. The broadcast image processing unit 151 may determine a broadcast schedule according to a channel selection inputted from a set-top box and request broadcast image data corresponding to the broadcast schedule. In some forms, the broadcast image processing unit 151 may request broadcast image data according to a selected channel. In another form, the broadcast image processing unit 151 may acquire identification information of a broadcast image corresponding to a broadcast schedule from the media cloud server 300, and acquire broadcast image data from the content server 200 by using the identification information of the broadcast image. In at least one variant, the broadcast image processing unit 151 may receive encoded broadcast image data from the content server 200. The broadcast image processing unit 151 may request broadcast image data, or VOD data, corresponding to a user input acquired from a set-top box, from the content server 200.

The progress data processing unit 152 may communicate with the media cloud server 300 to receive broadcast transmission progress data. The broadcast transmission progress data is automatically generated by the media cloud server 300 and may be generated in conjunction with currently transmitted broadcast image data or product information, but it is not limited thereto. For example, when a first product is being broadcast, the media cloud server 300 may acquire first product information with a first product code, and generate all or part of first product information as broadcast transmission progress data. When the first broadcast image data is transmitted, the media cloud server 300 may generate broadcast transmission progress data corresponding to the first broadcast image data.

The broadcast transmission progress data may be changed according to a user input acquired through the remote controller for TV broadcast 510 as shown in FIG. 1. The progress data processing unit 152 may transmit the acquired user input to the media cloud server 300 to request again broadcast transmission progress data corresponding to the acquired user input.

In some forms, the broadcast transmission progress data may include at least one of information on the progress of the current broadcast image, information on the end of the broadcast, review information registered in real time, and information on the current order status (number of orders, number of order reservations, ordered sales, etc.).

The user input management unit 153 may receive a user input by way of communication with the set-top box 500. The user input management unit 153 may receive a channel selection input and a user input and transmit the received inputs to the broadcast image processing unit 151 or the progress data processing unit 152.

Figure 7:
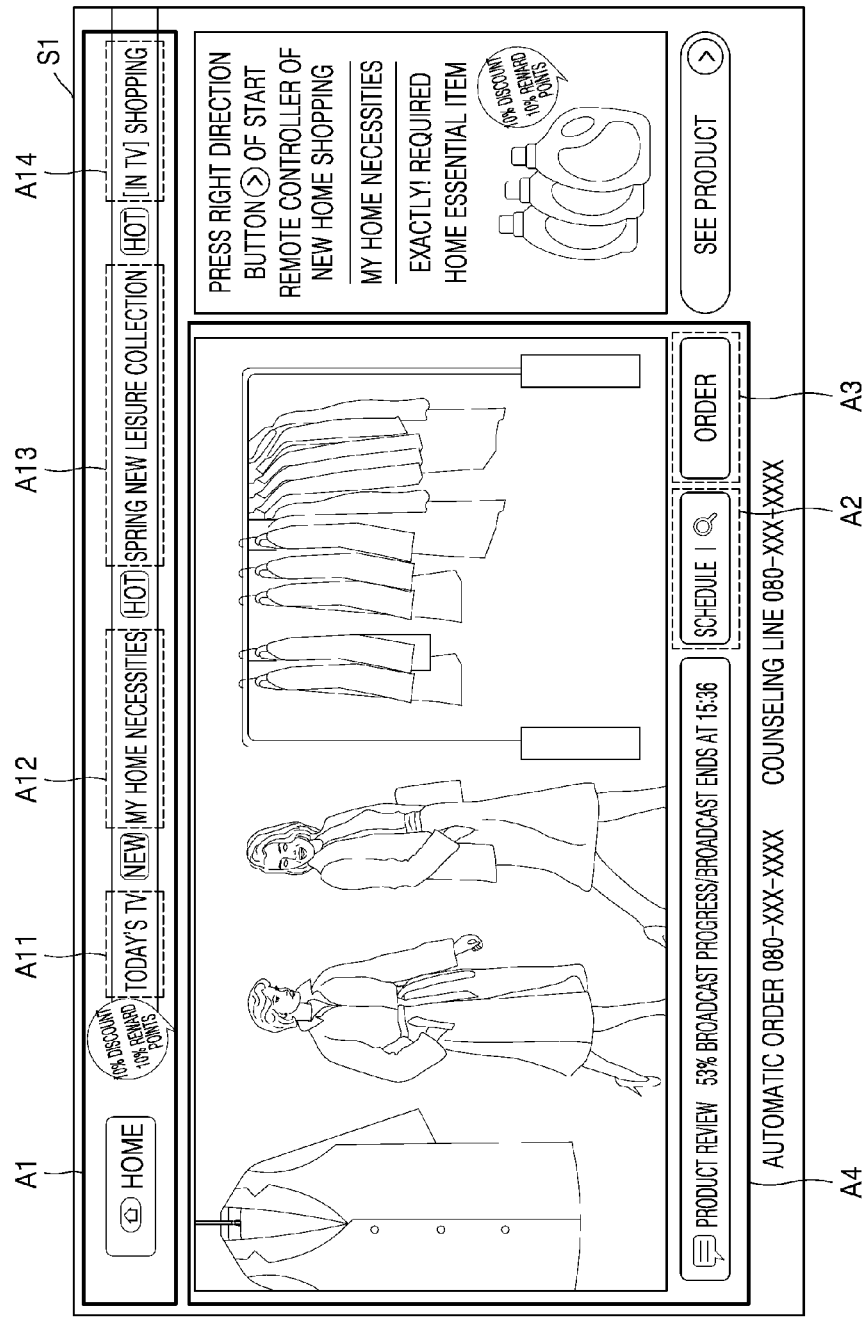
FIG. 7 is an exemplary display of output data generated by one or more embodiments of the present disclosure.

The user input management unit 153 may differently manage user inputs for one or more interfaces included in an user interface screen. For example, area A1 shown in FIG. 7 is selected as the user input, and the user input may include an identification code associated with the area A1. The user input in area A3 may include an identification code associated with the area A3. Processing of the user input may be different according to user interfaces included in the areas A1 and A3, respectively. In some forms, processing of the user input may be performed by a control signal from the media cloud server 300.

The broadcast output management unit 154 may combine the broadcast image data received from the broadcast image processing unit 151 and the broadcast transmission progress data received from the progress data processing unit 152 to generate output data to be outputted from the set-top box 500. The output data may be output through an output device such as a TV through the set-top box 500.

When a channel change input is inputted through an IPTV broadcast remote controller, the output of output data may be stopped under control of the set-top box 500.

When the broadcast image data received from the broadcast image processing unit 151 is updated, the broadcast output management unit 154 may control the updated broadcast image data to be output. When the broadcast transmission progress data received from the progress data processing unit 152 is updated, the broadcast output management unit 154 may control the updated broadcast transmission progress data to be output. The broadcast output management unit 154 may control to update the entire area or a partial area of the output data.

The broadcast output management unit 154 may process the output data to include a user interface based on the broadcasting signal received from the media cloud server 300. The media cloud server 300 may generate a broadcasting signal and transmit the generated broadcasting signal to the TV broadcast providing server 100. The media cloud server 300 may generate a broadcasting signal based on information received from the data server 400. The broadcasting signal is a control signal for including one or more user interfaces in output data for broadcast transmission.

The TV broadcast providing server 100 may generate broadcast output data that responds to user input as well as broadcast output data according to a broadcast channel. The TV broadcast providing server 100 may automatically generate data outputted to an area other than an area in which a previously captured broadcast image is outputted through the media cloud server 300. The TV broadcast providing server 100 may process data broadcasted under the control of the media cloud server 300 substantially in real time. Additionally, or alternatively, the TV broadcast providing server 100 may control to output broadcast transmission progress data in a predetermined order among product related information, delivery related information, and purchasing related information such as discounts.

Figure 3:
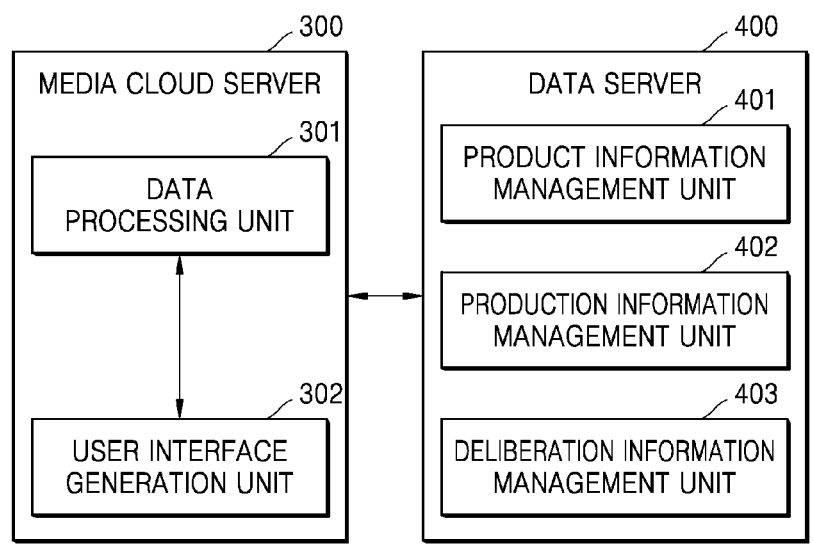
FIG. 3 is a diagram illustrating data transmission and reception between a media cloud server and a data server.

FIG. 3 is a diagram illustrating data transmission and reception between the media cloud server 300 and the data server 400 as shown in FIG. 1.

The media cloud server 300 performs a function of generating broadcast transmission progress data and performs a function of controlling an output of a user interface included in the output data.

The media cloud server 300 may include a data processing unit 301 that receives product information, production information, and deliberation information related to broadcasting registered in the data server 400. The data processing unit 301 may receive data stored in the data server 400.

The data server 400 may include a product information management unit 401 that manages product information, a production information management unit 402, and a deliberation information management unit 403.

The media cloud server 300 may include a user interface generation unit 302. The user interface generation unit 302 may generate data to broadcast and may further include a user interface in the generated data. The user interface generation unit 302 may generate broadcast transmission data to be output based on information obtained from the data processing unit 301. The user interface generation unit 302 may generate broadcast transmission progress data based on the acquired product-related information, delivery-related information, discount-related information, and sales time-related information.

The user interface generation unit 302 may generate broadcast transmission progress data in consideration of a broadcast image or product that is broadcast. For example, while the first broadcast image data is outputted, the user interface generation unit 302 may generate product information, delivery information, discount information, and review information of the first broadcast image data as broadcast transmission progress data. In this case, the broadcast transmission progress data may further include output control information for outputting product information, delivery information, discount information, and review information in a predetermined order. Product information, delivery information, discount information, and review information included in broadcast transmission progress data may further include information on the time of output and may further include a rule that is outputted at the time of output.

Figure 4:
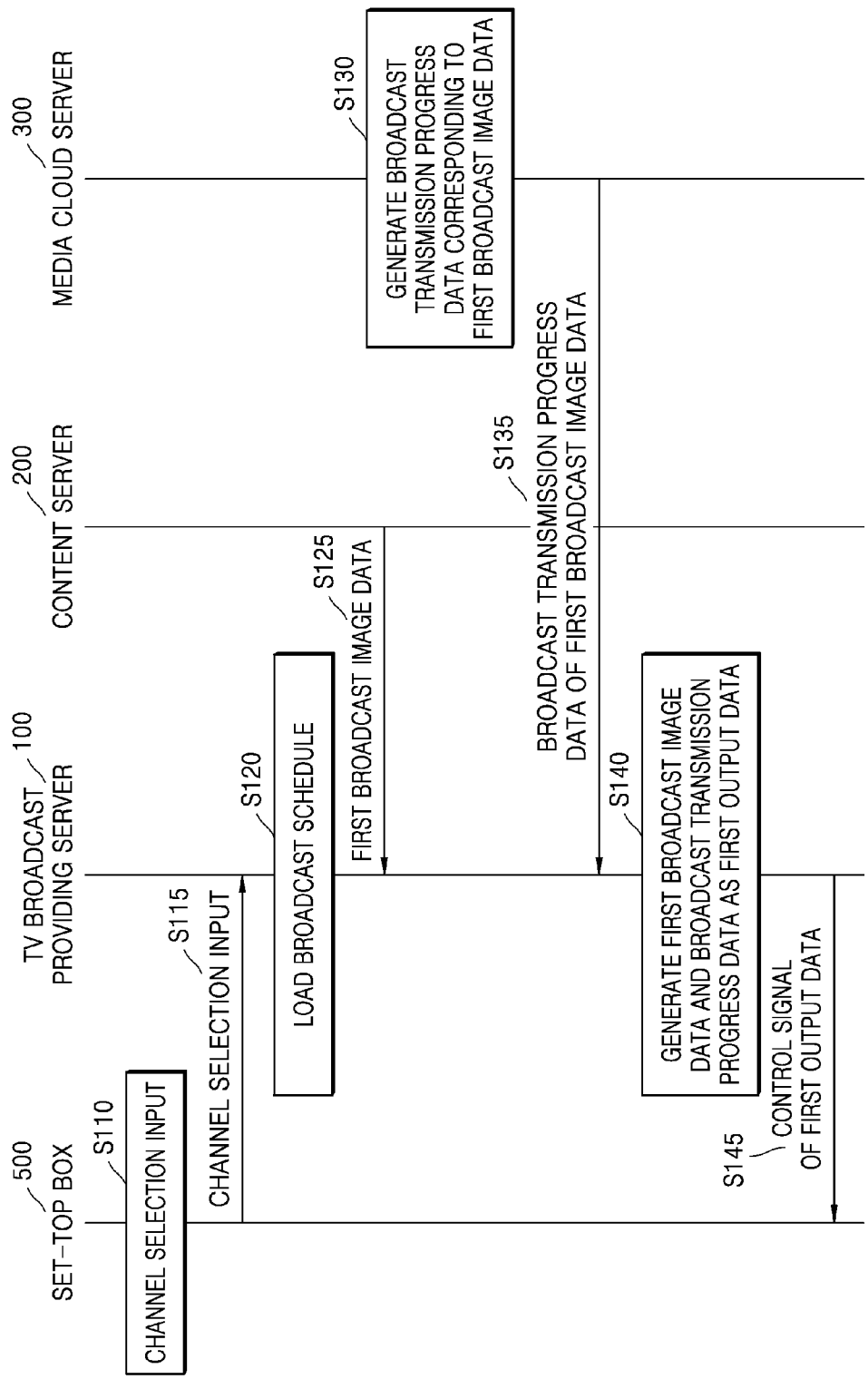
FIGS. 4 to 6 are flowcharts of a method of operating a TV broadcast providing server according to embodiments of the present disclosure, where.
Figure 5:
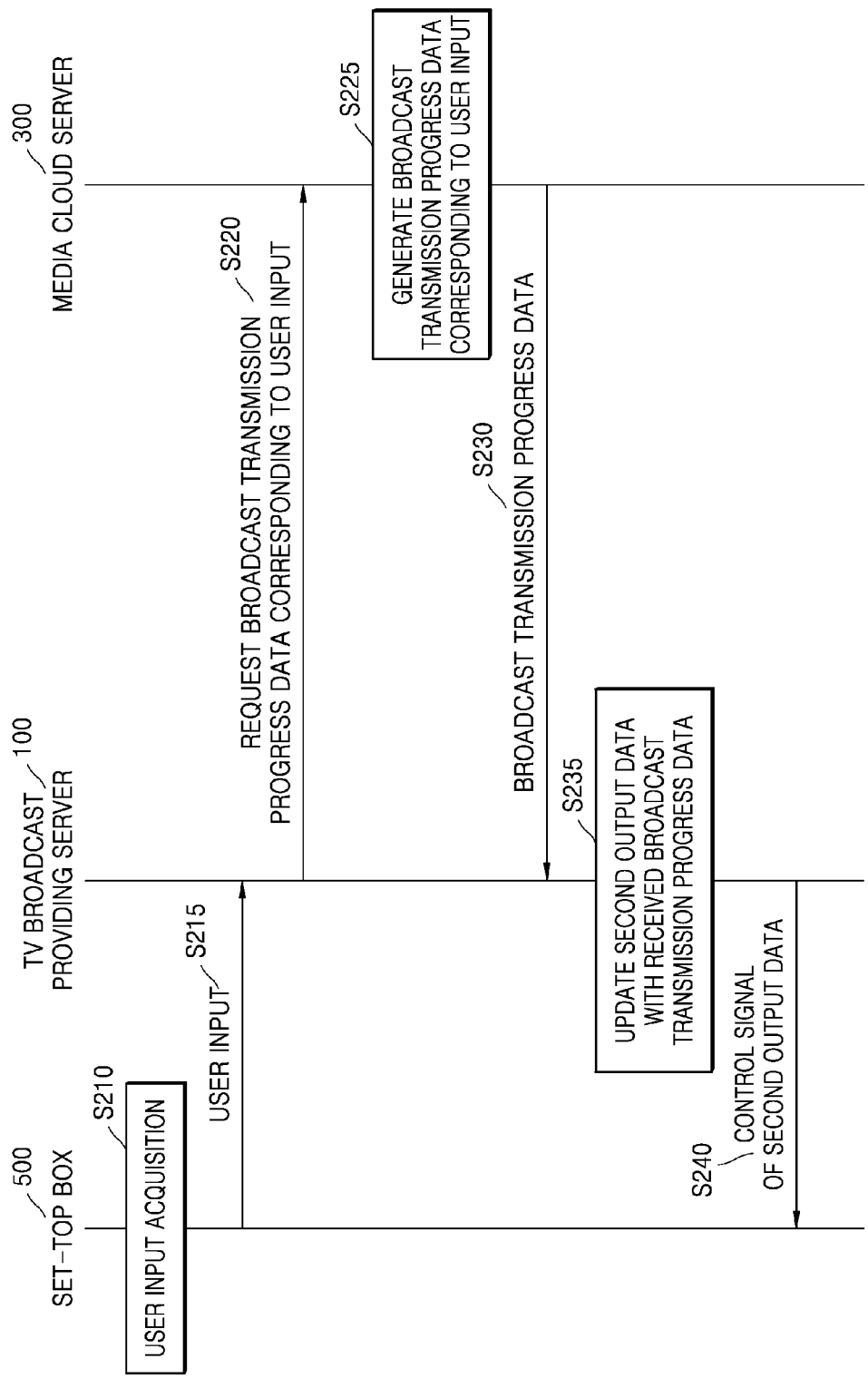
Figure 6:
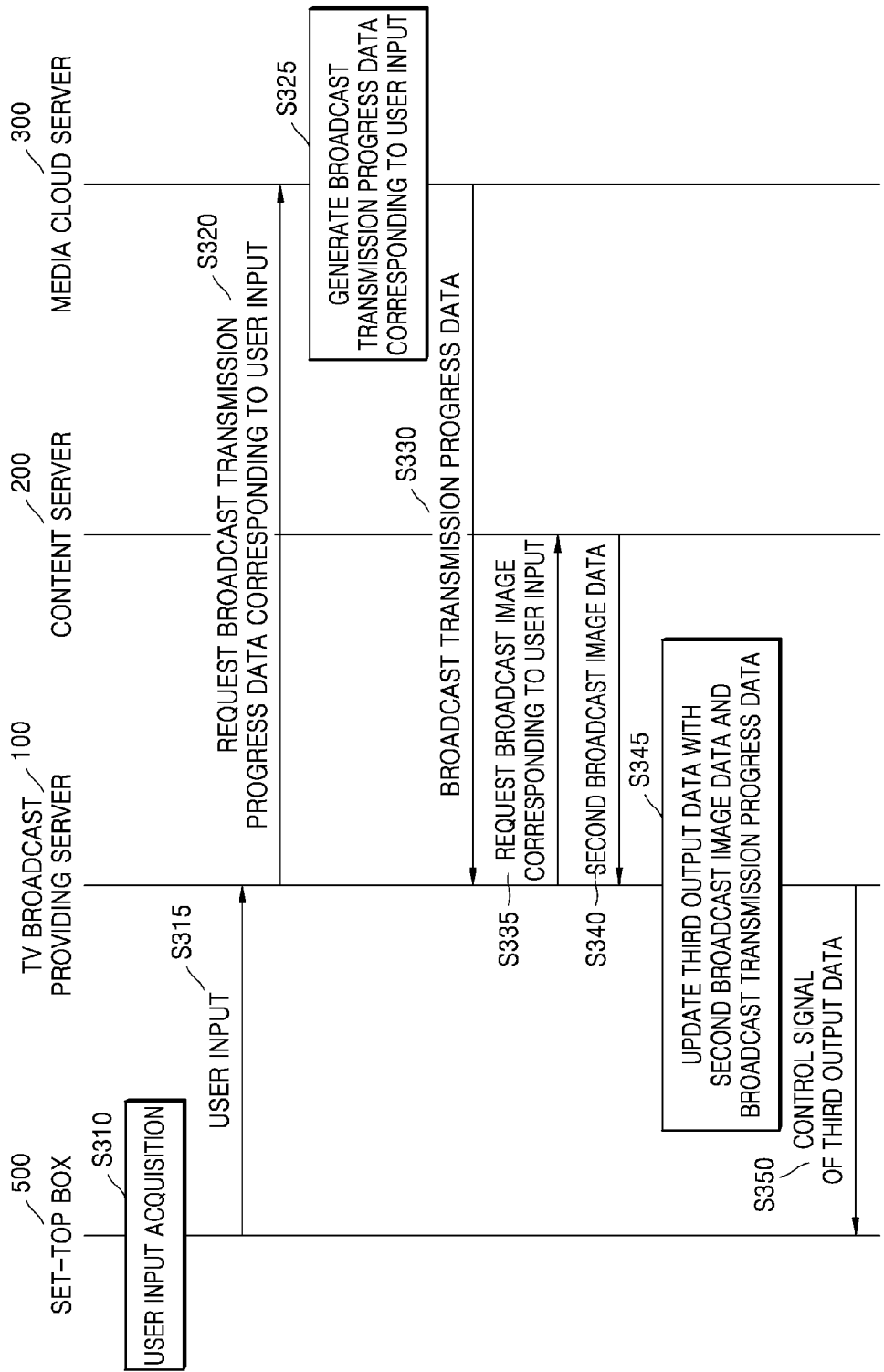

FIGS. 4 to 6 are flowcharts illustrating a method of operating the TV broadcast providing server 100 for TV home shopping according to embodiments of the present disclosure.

In S110, the set-top box 500 obtains a channel selection input from an IPTV broadcast remote controller. Through the program installed in the set-top box 500, the channel selection input may be transmitted to the TV broadcast providing server 100 (S115). The TV broadcast providing server 100 loads a broadcast schedule based on the channel information selected in the channel selection input (S120). The TV broadcast providing server 100 may request a broadcast image corresponding to the broadcast schedule to the content server 200 and receive first broadcast image data corresponding to the broadcast schedule from the content server 200 (S125). The TV broadcast providing server 100 may obtain identification information of the broadcast image to be requested from the media cloud server 300.

The TV broadcast providing server 100 may request and obtain broadcast transmission progress data from the media cloud server 300. The media cloud server 300 may generate broadcast transmission progress data based on broadcasted first broadcast image data, broadcast schedule, product information of the first broadcast image, or a combination thereof. The media cloud server 300 may request data corresponding to first broadcast image data, broadcast schedule, product information of the first broadcast image, or a combination thereof, from the data server 400, and generate broadcast transmission progress data based on the received data (S130). The media cloud server 300 may transmit broadcast transmission progress data to the TV broadcast providing server 100 (S135). The TV broadcast providing server 100 may generate first broadcast image data and broadcast transmission progress data as first output data (S140). The TV broadcast providing server 100 may control the first output data to be outputted through the TV 502 using the set-top box 500.

As shown in FIG. 5, while the TV broadcast is outputted, the TV broadcast providing server 100 may obtain a user input through the set-top box 500 (S210 and S215). The TV broadcast providing server 100 may request broadcast transmission progress data corresponding to the user input from the media cloud server 300 (S220). The media cloud server 300 may generate broadcast transmission progress data corresponding to the user input (S225) and transmit the broadcast transmission progress data to the TV broadcast providing server 100 (S230).

The TV broadcast providing server 100 updates the second output data with the received broadcast transmission progress data (S235). The TV broadcast providing server 100 may transmit a control signal of the second output data to the set-top box 500 (S240).

As shown in FIG. 6, while the TV broadcast is outputted, the TV broadcast providing server 100 may obtain a user input through the set-top box 500 (S310 and S315). The TV broadcast providing server 100 may request broadcast transmission progress data corresponding to the user input (S320). The media cloud server 300 may generate broadcast transmission progress data corresponding to the user input (S325). The media cloud server 300 may transmit broadcast transmission progress data to the TV broadcast providing server 100 (S330). The media cloud server 300 may also transmit identification information of a broadcast image to be broadcasted.

The TV broadcast providing server 100 may request broadcast image data corresponding to the user input from the content server 200 using data received from the media cloud server 300 (S335). The TV broadcast providing server 100 may receive second broadcast image data from the content server 200, generates third output data based on the second broadcast image data and the broadcast transmission progress data (S345), and transmit a control signal of the third output data to the set-top box 500 (S350).

FIG. 7 is an exemplary diagram of output data generated by embodiments of the present disclosure.

The output data 51 may include an area A1 including user interfaces, an area A4 for outputting broadcast transmission progress data, an area A2 associated with a search function, and an area A3 associated with an order function.

The area A1 including the user interfaces may include icons A11, A12, A13, and A14 that can be shortcuts to various functions. The user may select one of A11, A12, A13, and A14 using the remote controller for TV broadcast 510 and in response to the selection input, and may be directed to the pages of today's TV A11, my home necessities A12, spring new leisure collection A13, and shopping A14. The pages of today's TV A11, my home necessities A12, spring new leisure collection A13, and shopping A14 may be obtained through the media cloud server 300 and may be outputted to a TV.

In response to a selection input for the area A2 associated with the search function or the area A3 associated with the order function, a search page or an order page may be outputted.

Figure 8:
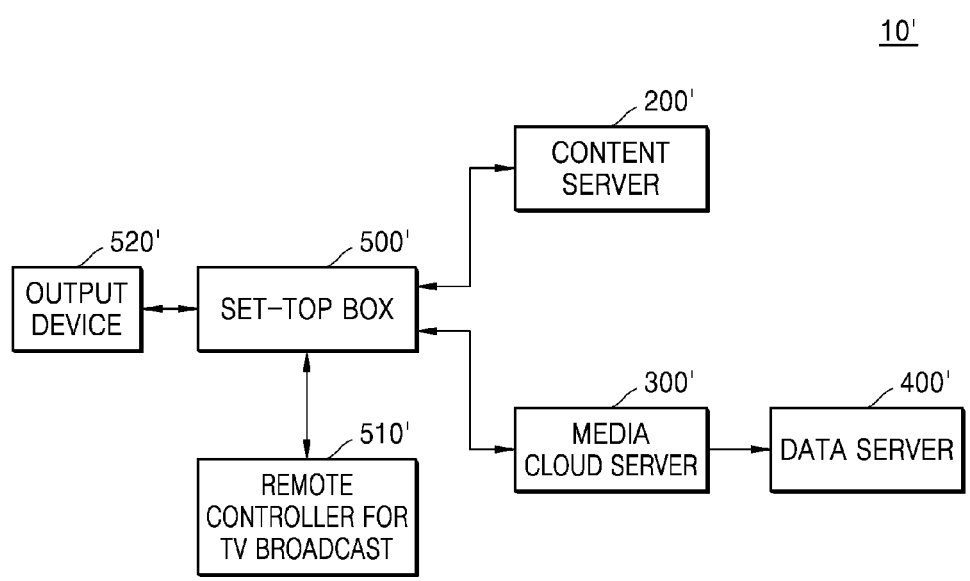
FIG. 8 is a diagram illustrating a network environment of a TV broadcasting system including a TV broadcast providing server according to one or more embodiments of the present disclosure.

FIG. 8 is a diagram illustrating a network environment of a TV broadcasting system 10' according to another embodiment of the present disclosure. The TV broadcasting system 10' includes a content server 200', a media cloud server 300' and a data server 400'.

The TV broadcasting system 10' can output broadcast images through a set-top box 500' in which a program that generates broadcast output data is installed.

The set-top box 500' may output broadcast output data to an output device 520' such as TV based on data received from the content server 200' and the media cloud server 300'.

The set-top box 500' may communicate with the media cloud server 300' and the content server 200' through a network. The set-top box 300 may transmit a control signal and/or an output signal to an output device 520' such as a TV based on data received from the media cloud server 300' and the content server 200'.

The set-top box 500' may include a program for decoding received data and may generate an output signal by encoding the data. The output device 520' such as a TV includes a TV, a smart TV, and the like, and it is not limited thereto. In other forms, the output device 502' may include any type of electronic device having a display such as a smart phone or a PMP.

The set-top box 500' may transmit a user input from a separate input device or via an output device 520' such as a TV to the media providing server 300.

The TV broadcasting system may generate broadcast output data through the media cloud server 300' and transmit broadcast output data from the media cloud server 300' to the set-top box 500'. In this case, the broadcast output data may be an encoded format or index information. The media cloud server 300' may transmit broadcast output data to the set-top box 500' using a cloud service.

The media cloud server 300' may transmit content information corresponding to the output data to the set-top box 500'. The media cloud server 300' may execute an application stored and display the application while streaming on an output device 520' such as a TV of each user. In this case, the output device 520' such as a TV may be controlled through a program installed in the set-top box 500', and may output broadcast content or commerce content by controlling the set-top box 500'. The set-top box 500' may be implemented to operate through commands from the media cloud server 300'.

The media cloud server 300' may generate broadcast output data based on data received from the data server 400'. The media cloud server 300' may receive product information, customer information, order information, and program information from the data server 400'. Meanwhile, the media cloud server 300' may control the set-top box 500' through a program installed in the set-top box 500'. The media cloud server 300' may perform a function of reading information of the set-top box 500'. The media cloud server 300' may receive the platform code, STP ID, and access information of the set-top box 500'. The media cloud server 300' may generate output data of the set-top box 500' based on information on the set-top box 500'. The media cloud server 300' may regenerate broadcast output data in response to a user input acquired through the set-top box 500' and transmit the generated broadcast output data to the set-top box 500'.

The media cloud server 300' may allow to capture information of these contents instead of information including various contents such as operations through the cloud solution to be displayed on a screen of the output device 520' such as a TV through the set-top box 500'. The media cloud server 300' may be implemented using a cloud server, and may control conversion of one or more first and second cloud servers. The media cloud server 300' may implement a screen in the output device 520' such as a TV by driving an application corresponding to the selected channel through the first cloud server, and may accommodate a plurality of users through this.

The set-top box 500' may communicate with the media cloud server 300' to receive output data, interpret and read (encode, etc.) the received output data, and output the interpreted and read output data through the output device 520' such as a TV. The set-top box 500' may output broadcast output data received from the media cloud server 300' through the output device 520' such as a TV. The set-top box 500' may acquire a user input through the provided remote controller for TV broadcast 510' and transmit a request signal corresponding to the user input to the media cloud server 300'.

The content server 200' performs a function of transmitting broadcast content of one or more broadcasters or broadcast channels to the set-top boxes 500'. The content server 200' may transmit content requested by each set-top box 500'. The content server 200' may be implemented to broadcast and transmit content received from a content providing server.

The data server 400' may store and manage information for generating broadcast output data. The data server 400' is a computing device in which a server program such as Apache Tomcat® or Oracle is installed, and may be implemented to process server functions. As described above, the data server 400' may store product information, production information, and/or deliberation information of content. In addition, the data server 400' may store image identification information, pop-up data, and the like, and provide related information to the media cloud server 300' in response to a request from the media cloud server 300'.

The TV broadcast providing system according to an embodiment of the present disclosure may further include a content providing server (not shown). The content providing server may register (e.g., obtain and store) content such as a commerce video to be provided. In addition, the content providing server may receive meta information of content such as video from the data server 400' and match the meta information for each content. For this, the content providing server may be connected to the data server 400', and exchange various information with each other through communication.

The content providing server may convert content such as a registered video according to a platform or format of each broadcaster and transmit the converted content to the content server 200'. Of course, the present disclosure is not limited thereto, and the content providing server stores the content and transmits the stored content to the content server 200', and the content server 200' may convert and store the corresponding content according to the platform or format of the broadcaster. This is the same in the following embodiments and variations thereof.

Meanwhile, the content providing server may obtain meta information of the content from the data server 400'. The meta information may include product information, production information, and/or deliberation information related to the corresponding content. Of course, in some cases, the content providing server may directly receive and store meta information from a content provider.

The content providing server may transmit content data such as video or converted content data to the content server 200' through a distributed network (e.g., CDN). In addition, the content providing server may receive image identification information of each video from the content server 200'. The image identification information may be, for example, reproduction URL information stored in the content server 200.

Figure 9:
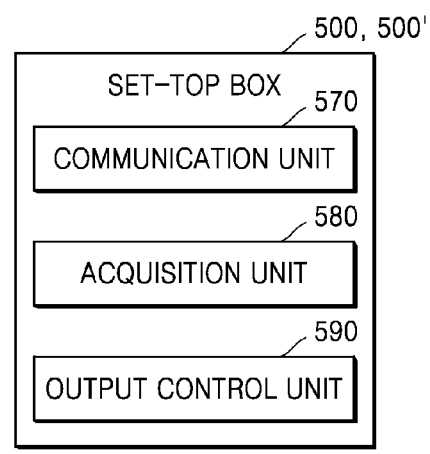
FIG. 9 is a block diagram of set-top boxes.

FIG. 9 is a block diagram of set-top boxes 500 and 500'.

The set-top boxes 500 and 500' may include a communication unit 570 performing communication with a TV broadcast providing server, an acquisition unit 580 acquiring a user input from a remote controller for TV broadcast, and an output control unit 590.

The output control unit 590 may transmit broadcast output data to an external output device such as a TV. The output control unit 590 may control to output the output data received from a TV broadcast providing server through an external output device.

The output control unit 590 may communicate with the media cloud server 300, 300' to receive broadcast image data for broadcast transmission. The output control unit 590 may determine a broadcast schedule according to a channel selection inputted from a set-top box and request broadcast image data corresponding to the broadcast schedule. The output control unit 590 may request broadcast image data according to a selected channel. In another embodiment, the output control unit 590 may acquire identification information of a broadcast image corresponding to a broadcast schedule from the media cloud server 300, 300', and acquire broadcast image data from the content server 200, 200' by using the identification information of the broadcast image. The output control unit 590 may receive encoded broadcast image data from the content server 200, 200'. The output control unit 590 may request broadcast image data or VOD data corresponding to a user input acquired from a set-top box from the content server 200, 200'.

The output control unit 590 may communicate with the media cloud server 300, 300' to receive broadcast transmission progress data. The broadcast transmission progress data is automatically generated by the media cloud server 300, 300' and may be generated in conjunction with currently transmitted broadcast image data or product information, but it is not limited thereto. For example, when the first product is broadcast, the media cloud server 300, 300' may acquire first product information with a first product code, and generate all or part of the first product information as broadcast transmission progress data. When the first broadcast image data is transmitted, the media cloud server 300, 300' may generate broadcast transmission progress data corresponding to the first broadcast image data.

The broadcast transmission progress data may be changed according to a user input acquired through a remote controller for TV broadcast. The output control unit 590 may transmit the acquired user input to the media cloud server 300, 300' to request again broadcast transmission progress data corresponding to the acquired user input.

The output control unit 590 may differently manage user inputs for one or more interfaces included in the outputted user interface screen. For example, the A1 area shown in FIG. 7 is selected as the user input, and the user input may include an identification code associated with the area A1. The user input in which A3 is selected and inputted may include an identification code associated with the area A3. Processing of the inputted input user may be different according to user interfaces included in the areas A1 and A3, respectively. Processing of the inputted user input may be performed by a control signal from the media cloud server 300, 300'.

The output control unit 590 may generate output data to be outputted by combining broadcast image data and broadcast transmission progress data. The output data may be outputted through an output device such as a TV.

When a channel change input is inputted through a remote controller for TV broadcast, the output of output data may be stopped under control of the set-top box 500, 500'.

When the broadcast image data received from the broadcast image processing unit 151 (FIG. 2) is updated, the output control unit 590 may control the updated broadcast image data to be outputted. When the broadcast transmission progress data is updated, the output control unit 590 may control the updated broadcast transmission progress data to be outputted. The output control unit 590 may control to update the entire area or a partial area of the output data.

Referring back to FIG. 9, the output control unit 590 may process the output data to include a user interface based on the broadcasting signal received from the media cloud server 300, 300'. The media cloud server 300 may generate a broadcasting signal and transmit the generated broadcasting signal to the TV broadcast providing server 100. The media cloud server 300' may generate a broadcasting signal and transmit the generated broadcasting signal to the set-top box 500'. The media cloud server 300, 300' may generate a broadcasting signal based on information received from the data server 400. The broadcasting signal is a control signal for including one or more user interfaces in output data for broadcast transmission.

Figure 10:
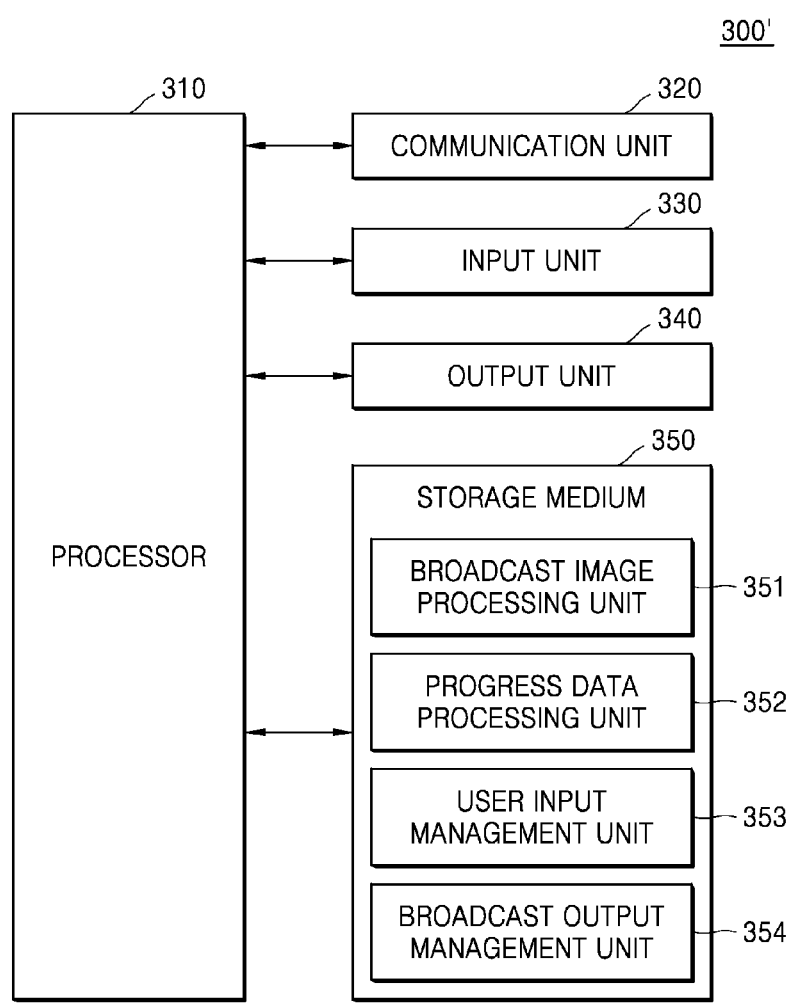
FIG. 10 is a block diagram of a media cloud server according to one or more embodiments of the present disclosure.

FIG. 10 is a block diagram of the media cloud server 300' of FIG. 8.

The processor 310 is a component for overall control of the media cloud server 300'. Specifically, the processor 310 controls the overall operation of the media cloud server 300' using various programs stored in the storage medium 350 of the media cloud server 300'. For example, the processor 310 may include a CPU, RAM, ROM, and a system bus. Here, the ROM is a component in which the command set for booting the system is stored, and the CPU copies the stored O/S of the media cloud server 300' to RAM according to the command stored in the ROM, and executes O/S to boot the system. When booting is complete, the CPU can perform various operations by copying various stored applications to RAM and executing the various stored applications. In the above, it has been described that the media cloud server 300' includes only one CPU, but may be implemented with a plurality of CPUs (or DSP, SoC, etc.).

According to an embodiment of the present disclosure, the processor 310 may be implemented as a digital signal processor (DSP) that processes digital signals, a microprocessor, and a time controller (TCON). However, the processor 310 is not limited thereto, and may include one or more of a central processing unit (CPU), a microcontroller unit (MCU), a micro processing unit (MPU), a controller, an application processor (AP), a communication processor (CP), and an advanced RISC machine (ARM) processor, or may be defined in the corresponding term. In addition, the processor 310 may be implemented as a system on chip (SoC) or large scale integration (LSI) with a built-in processing algorithm, or may be implemented in the form of a field programmable gate array (FPGA).

The output unit 340 may display an interface generated by the media cloud server 300' by the storage medium 350. According to an embodiment of the present disclosure, the output unit 340 may display a user interface for a user input inputted through the input unit 330. The output unit 340 may output stored graphic data, visual data, auditory data, and vibration data under the control of the storage medium 350.

The input unit 330 may include a user interface for inputting various information to the media cloud server 300'.

The communication unit 320 is a component for transmitting and receiving data with devices such as a server and other electronic devices. The communication unit 320 may include a short-range communication unit such as a Bluetooth communication unit, a Bluetooth Low Energy (BLE) communication unit, a Near Field Communication unit, a wireless local area network (WLAN) communication unit, a Zigbee communication unit, an infrared Data Association (IRDA) communication unit, a Wi-Fi Direct (WFD) communication unit, a ultra wideband (UWB) communication unit, and an Ant+ communication unit, a mobile communication network, or a wired Ethernet network.

The communication unit 320 may be a component for communicating by being connected to the content server 200 through a CDN.

The media cloud server 300' may further include a storage medium (not shown) storing various data for overall operation, including a program for processing or controlling the processor 310. The storage medium may store data and instructions for a number of application programs or applications running in the media cloud server 300', and operations of the TV broadcast providing server 100. At least some of these application programs may be downloaded from an external server through wireless communication. In addition, at least some of these application programs may exist on the media cloud server 300' from the time of shipment for basic functions of the media cloud server 300'. The application program may be stored in a storage medium and driven by the processor 310 to perform an operation (or function) of the media cloud server 300'.

The storage medium 350 may include a broadcast image processing unit 351, a progress data processing unit 352, a user input management unit 353, and a broadcast output management unit 354 to generate output data for TV broadcasting.

The broadcast image processing unit 351 may receive broadcast image data for broadcast transmission from the data server 400', for example, route information and identification information of a broadcast image. The broadcast image processing unit 351 may determine a broadcast schedule according to a channel selection inputted from a set-top box and request broadcast image data corresponding to the broadcast schedule. The broadcast image processing unit 351 may request broadcast image data according to a selected channel. In another embodiment, the broadcast image processing unit 351 may acquire identification information of a broadcast image corresponding to a broadcast schedule from the data server 400', and allow the set-top box 500' to acquire broadcast image data from the content server 200' by using the identification information of the broadcast image. The broadcast image processing unit 351 may receive encoded broadcast image data from the content server 200'. The broadcast image processing unit 351 may request broadcast image data or VOD data corresponding to a user input acquired from a set-top box from the content server 200'.

The progress data processing unit 352 may communicate with the data server 400' to receive broadcast transmission progress data. The broadcast transmission progress data may be generated in conjunction with currently transmitted broadcast image data or product information, but is not limited thereto. For example, when the first product is broadcast, the media cloud server 300' may acquire first product information with a first product code, and generate all or part of the first product information as broadcast transmission progress data. When the first broadcast image data is transmitted, the media cloud server 300' may generate broadcast transmission progress data corresponding to the first broadcast image data.

The broadcast transmission progress data may be changed according to a user input acquired through a remote controller for TV broadcast. The progress data processing unit 352 may regenerate broadcast transmission progress data corresponding to the acquired user input.

In some forms, the broadcast transmission progress data may include at least one of information on the progress of the current broadcast image, information on the end of the broadcast, review information registered in real time, and information on the current order status (number of orders, number of order reservations, ordered sales, etc.).

The user input management unit 353 may receive a user input by way of communication with the set-top box 500'. The user input management unit 353 may receive a channel selection input and a user input and transmit the received inputs to the broadcast image processing unit 351 or the progress data processing unit 352.

The user input management unit 353 may differently manage user inputs for one or more interfaces included in an user interface screen. For example, area A1 shown in FIG. 7 is selected as the user input, and the user input may include an identification code associated with the area A1. The user input in area A3 may include an identification code associated with the area A3. Processing of the user input may be different according to user interfaces included in the areas A1 and A3, respectively. Processing of the user input, upon input, may be performed by a control signal from the media cloud server 300.

The broadcast output management unit 354 may combine the broadcast image data (or broadcast image identification information) received from the broadcast image processing unit 351 and the broadcast transmission progress data received from the progress data processing unit 352 to generate output data to be outputted from the set-top box 500'. The output data may be outputted through an output device such as a TV through the set-top box 500'.

When a channel change input is inputted through a broadcast remote control, the output of output data may be stopped by control of the set-top box 500'.

When the broadcast image data received from the broadcast image processing unit 351 is updated, the broadcast output management unit 354 may control the updated broadcast image data to be outputted. When the broadcast transmission progress data received from the progress data processing unit 352 is updated, the broadcast output management unit 354 may control the updated broadcast transmission progress data to be outputted. The broadcast output management unit 354 may control to update the entire area or a partial area of the output data.

The broadcast output management unit 354 may process to include a user interface in output data outputted from the set-top box 500'. The media cloud server 300' may generate a broadcasting signal for output control and transmit the generated broadcasting signal to the set-top box 500'. The media cloud server 300' may generate a broadcasting signal based on information received from the data server 400'. The broadcasting signal is a control signal for including one or more user interfaces in output data for broadcast transmission.

The media cloud server 300' may generate broadcast output data that responds to user input as well as broadcast output data according to a broadcast channel. The media cloud server 300' may generate data that is outputted to an area other than an area in which a previously captured broadcast image is outputted. The media cloud server 300' may process broadcast data substantially in real time. Additionally, or alternatively, the media cloud server 300' may control to output broadcast transmission progress data in a predetermined order among product related information, delivery related information, and purchasing related information such as discounts.

The device described above may be implemented as a hardware component, a software component, and/or a combination of a hardware component and a software component. For example, the devices and components described in the embodiments may be implemented using one or more general purpose computers or special purpose computers, for example, a processor, a controller, an arithmetic logic unit (ALU), a digital signal processor, a microcomputer, a field programmable gate array (FPGA), a programmable logic unit (PLU), a microprocessor, or any other device capable of executing and responding to instructions. The processing device may execute an operating system (OS) and one or more software applications executed on the OS. In addition, the processing device may access, store, operate, process, and generate data in response to the execution of software. For the convenience of understanding, in some cases, one processing device is described as being used, but those of ordinary skill in the art will appreciate that the processing device may include a plurality of processing elements and/or multiple types of processing elements. For example, the processing device may include a plurality of processors or one processor and one controller. In addition, other processing configurations are possible, such as a parallel processor.

The software may include a computer program, code, instruction, or a combination of one or more of these, and may configure the processing device to operate as desired, or may command the processing device independently or collectively. In order to be interpreted by the processing device or to provide commands or data to the processing device, software and/or data may be permanently or temporarily embodied in any type of machine, component, physical device, virtual equipment, computer storage medium or device, or signal wave to be transmitted. The software may be distributed over networked computer systems and stored or executed in a distributed manner. Software and data may be stored on one or more computer-readable recording media.

The method according to the embodiment may be implemented in the form of program instructions that can be executed through various computer means and recorded in a computer-readable medium. The computer-readable medium may include program instructions, data files, data structures, etc. alone or in combination. The program instructions recorded in the medium may be specially designed and configured for embodiments, or may be known and usable to those skilled in computer software. Examples of computer-readable recording media include hardware devices specially configured to store and execute program instructions, for example, magnetic media such as hard disks, floppy disks and magnetic tapes, optical media such as CD-ROM and DVD, magneto-optical media such as a floptical disk, and ROM, RAM, flash memory, etc. Examples of the program instructions include not only machine language codes such as those produced by a compiler, but also high-level language codes that can be executed by a computer using an interpreter or the like. The above-described hardware device may be configured to operate as one or more software modules to perform the operation of an embodiment, and vice versa.

A TV broadcasting system that automatically generates broadcast transmission progress data according to embodiments of the present disclosure may generate and provide broadcast transmission progress data with respect to a real-time broadcast image, including product information, discount information, and delivery information related to real-time broadcast image.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A broadcasting system that automatically generates progress data for broadcasting a transmission, comprising:
  a set-top box configured to obtain a user input from a subscriber;
  a content server in communication with the set-top box and configured to transmit broadcast image data corresponding to the user input of the set-top box to the set-top box; and
  a media cloud server in communication with the set-top box and configured to:
    receive an identification information of the broadcast image data, a product associated with the broadcast image data, product information associated with the product, discount information associated with the product, delivery information associated with product, and review information associated with the product,
    automatically generate broadcast transmission progress data corresponding to the broadcast image data substantially in real time,
    generate an output data based on a combination of the identification of the broadcast image data and the broadcast transmission progress data,
    transmit the output data to the set-top box, and
    control the set-top box to acquire the broadcast image data from the content server using the identification information and display the broadcast image data and the broadcast transmission progress data on a TV connected to the set-top box.

2. The broadcasting system of claim 1, while a broadcast is on, the media cloud server is further configured to:
  receive the user input from the set-top box and request information corresponding to broadcast image corresponding to the user input from a data server;
  transmit an identification information of second broadcast image data to the set-top box; and
  generate updated broadcast transmission progress data corresponding to the user input and transmit the updated broadcast transmission progress data to the set-top box.

3. The broadcasting system of claim 1, wherein while a selected product is being broadcast, the media cloud server is further configured to update the broadcast transmission progress data in response to the user input, a different broadcast image data, or both.

4. The broadcast system of claim 1, wherein the media cloud server further comprises a user interface generation unit that generates data to broadcast including a user interface and generates the broadcast transmission progress data including the product information relating to a selected product.

5. A broadcasting system that automatically generates progress data for broadcasting a transmission, comprising:
  a media cloud server configured to:
    receive an identification information of first broadcast image data to be outputted according to an output schedule from a data server, receive product information of the first broadcast image data and detailed information of the first broadcast image data from the data server;

automatically generate broadcast transmission progress data corresponding to the first broadcast image data, the product information of the first broadcast image data, and the detailed information of the first broadcast image data substantially in real time;

generate an output data based on a combination of the identification information of the first broadcast image data and the broadcast transmission progress data;

transmit the output data to a set-top box; and control a TV connected to the set-top box to acquire the first broadcast image data from a content server and display the first broadcast image and the broadcast transmission progress data.

6. The broadcasting system of claim 5, wherein the broadcasting system further comprises:

the set-top box configured to control the output data received from the media cloud server and transmit the output data to an external output device.

7. The broadcasting system of claim 5, wherein the media cloud server is further configured to:

regenerate the broadcast transmission progress data in response to a user input acquired through the set-top box; and transmit the regenerated broadcast transmission progress data to the set-top box.

8. The broadcasting system of claim 7, wherein the media cloud server is further configured to receive broadcast transmission progress data of second broadcast image data corresponding to an identification (ID) of the second broadcast image data from the data server, according to a control signal for stopping transmission of the first broadcasting image data and starting transmission of the second broadcasting image data.

9. The broadcasting system of claim 5, wherein the broadcast transmission progress data comprises discount information, broadcast time information, and review information of the first broadcast image data, wherein the discount information, the broadcast time information, and the review information of the first broadcast image data are controlled to be sequentially output in a random order.

10. The broadcasting system of claim 7, wherein the media cloud server is further configured to:

receive first user input received from the set-top box;

generate a user interface according to the first user input; and display the output data on the user interface.

11. A method of operating a media cloud server, comprising:

receiving, by a media cloud server, an identification information of broadcast image data to be output according to an output schedule from a data server, receiving product information of the broadcast image data and detailed information of the broadcast image data from the data server;

automatically generating, by the media cloud server and substantially in real time, broadcast transmission progress data corresponding to the broadcast image data, the product information of the broadcast image data, and the detailed information of the broadcast image data;

generating, by the media cloud server, an output data based on a combination of the identification information of the broadcast image data and the broadcast transmission progress data and transmitting the generated output data to a set-top box; and controlling a TV connected to the set-top box to acquire the broadcast image data from a content server and display the broadcast image data and the broadcast transmission progress data.

12. The method of claim 11, further comprising:

in response to a user input acquired through the set-top box, regenerating, by the media cloud server, the broadcast transmission progress data, and transmitting, by the media cloud server, the regenerated broadcast transmission progress data to the set-top box.

13. The method of claim 11, further comprising:

according to a control signal to start transmitting second broadcast image data, receiving, by the media cloud server, the broadcast transmission progress data generated using detailed information of the second broadcast image data corresponding to an identification (ID) of the second broadcast image data.

14. The method of claim 11, further comprising:

receiving, by the media cloud server, first user input received from the set-top box;

generating, by the media cloud server, a user interface according to the first user input; and processing the output data to be directly displayed on the user interface.

15. A non-transitory computer-readable recording medium storing therein an operating program that causes a computer to execute a process comprising:

receiving an identification information of broadcast image data to be output according to an output schedule from a data server;

receiving product information of the broadcast image data, and detailed information of the broadcast image data from the data server;

automatically generating and substantially in real time, broadcast transmission progress data corresponding to the broadcast image data, the product information of the broadcast image data, and the detailed information of the broadcast image data;

generating an output data based on a combination of the identification information of the broadcast image data and the broadcast transmission progress data and transmitting the generated output data to a set-top box; and controlling a TV connected to the set-top box to acquire the broadcast image data from a content server and display the broadcast image data and the broadcast transmission progress data.

* * * * *